June 16, 1931.    R. PETIT    1,810,851
ROTATABLE TRANSMISSION IRREVERSIBLE IN BOTH DIRECTIONS
Filed April 28, 1928    3 Sheets-Sheet 3

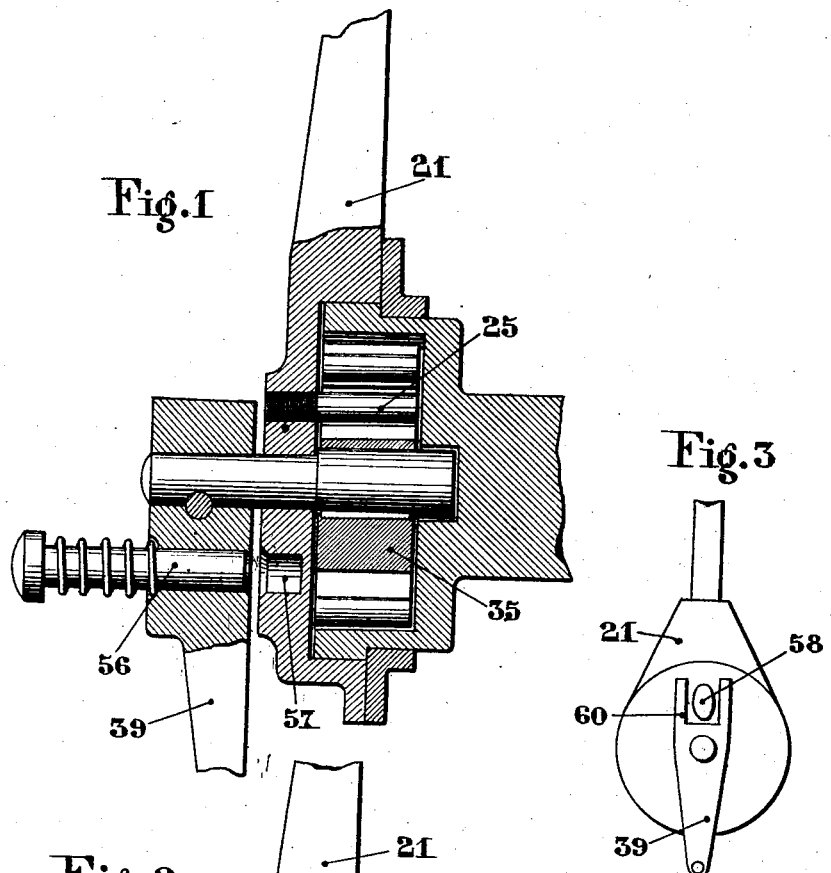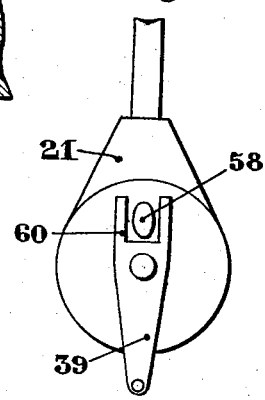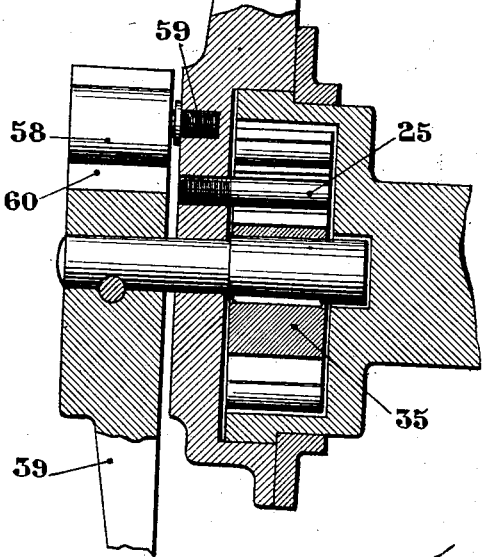

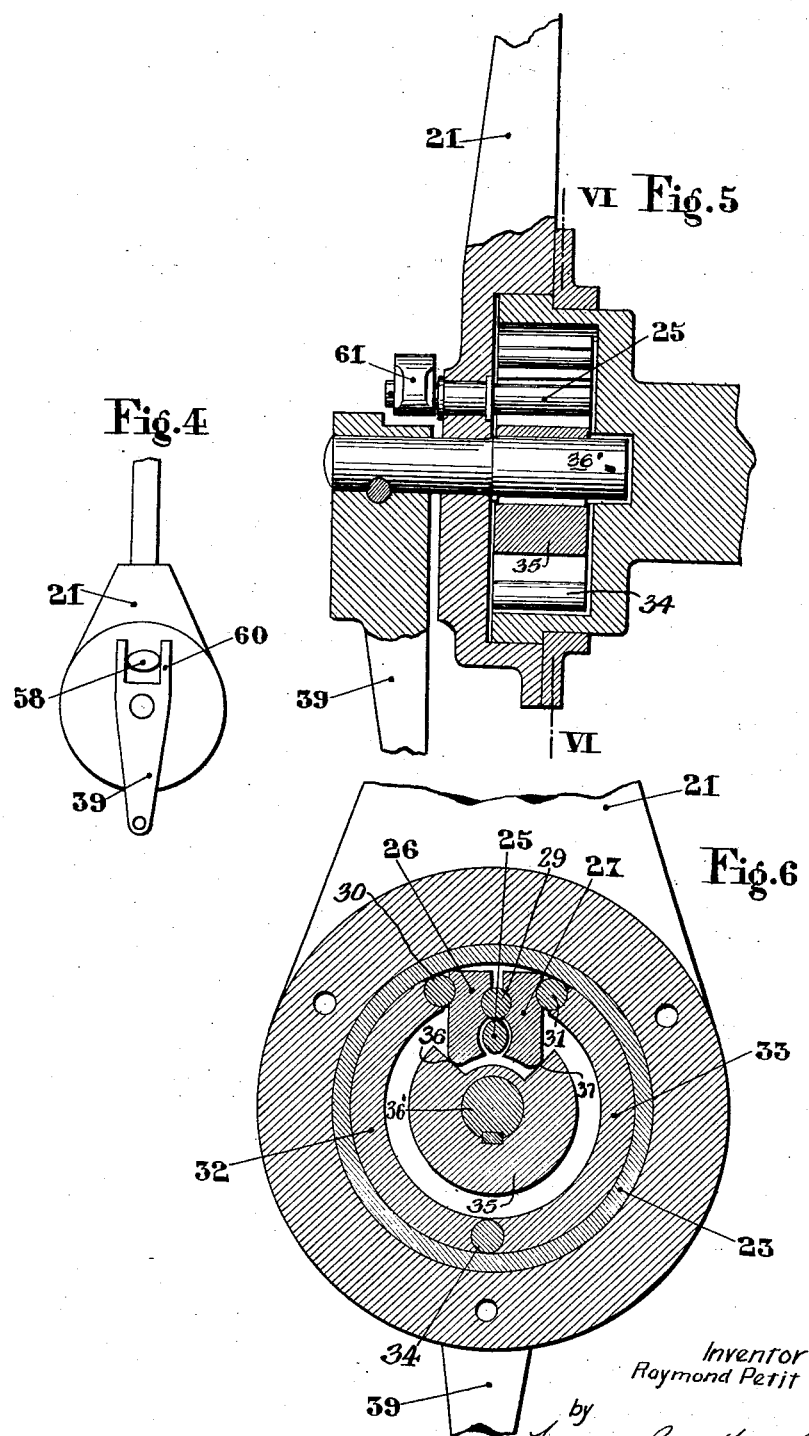

Inventor:
Raymond Petit,
by E. F. Wunderoth
Att'y.

Patented June 16, 1931

1,810,851

UNITED STATES PATENT OFFICE

RAYMOND PETIT, OF PARIS, FRANCE, ASSIGNOR TO SOCIÉTÉ ANONYME FRANCAISE DITE: BRICARD, ANCIENNE MAISON STERLIN, OF PARIS, FRANCE

ROTATABLE TRANSMISSION IRREVERSIBLE IN BOTH DIRECTIONS

Application filed April 28, 1928, Serial No. 273,533, and in France March 29, 1928.

The purpose of the present invention is to provide some useful improvements to direct irreversible transmission systems for angular movements such as specified in the U. S. patent application Ser. No. 246,597 of Jan. 13th, 1928 by Raymond Petit, said improvements allowing to effect as desired the partial or the total unlocking of the device.

In the accompanying drawings:

Fig. 1 is a diagrammatical view and section along the axis of rotation of an irreversible locking device.

Fig. 2 is a section along the axis of rotation of the same irreversible locking device comprising a releasing member which opposes wholly or partially to the secondary reactions of the controlling levers of the locking segments.

Fig. 3 is a diagrammatical front view on a reduced scale of the same device, the cam being in a position where it does not act upon the irreversible system.

Fig. 4 is a similiar diagrammatical view, the releasing cam being in another position.

Fig. 5 is a section along the axis of rotation of an irreversible locking device provided with a member controlling the distance between the lower arms of the levers.

Fig. 6 is a section along line VI—VI of Fig. 5 of the same device provided with the same controlling member.

Figure 7:
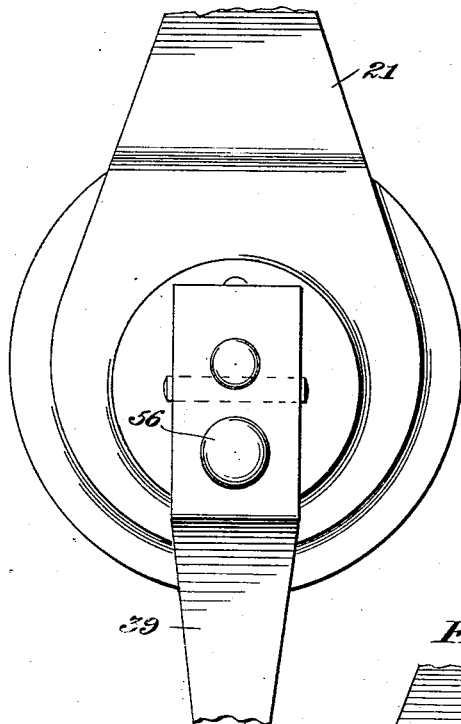
Figure 8:
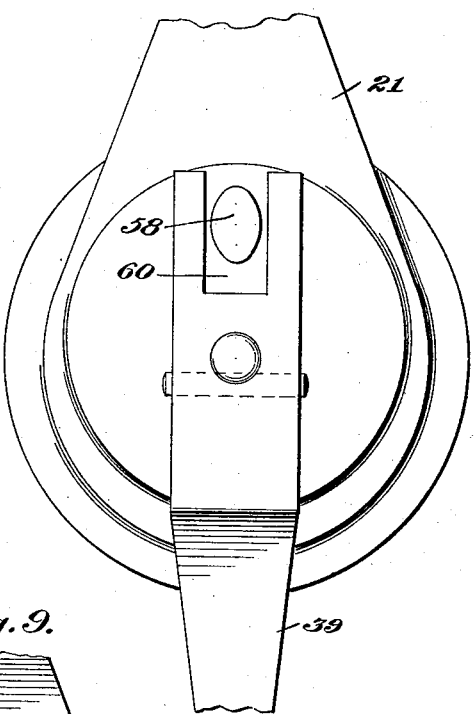
Figure 9:
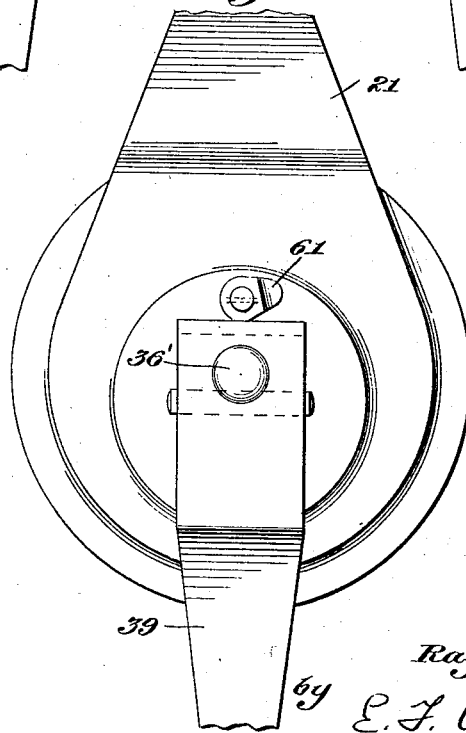

Figs. 7, 8, and 9 are elevations respectively of the devices shown in Figs. 1, 2, and 5.

The type of apparatus on which the device is to be employed is perhaps best illustrated in my prior application previously referred to, and the details of which are shown in present Figs. 5 and 6. As is evident therefrom the fixed box 23 has interiorly mounted therein an eccentric or cam-shaped tenon 25.

This tenon engages in a housing formed by the two levers 26 and 27, and is suitably shaped for this purpose. These two levers pivot on a common free trunnion 29 and are separated a sufficient distance to enable them to ordinarily oscillate slightly on the said trunnion. At their ends nearest the inner wall of the said box and at their faces opposed to that on which the said free trunnion 29 bears, the levers 26 and 27 pivot respectively on free trunnions 30 and 31, on which latter also rest the free segments 32 and 33, the outer cylindrical curvature of which is the same as that of the inner walls of the box 23 and which pivot at their other end on the free trunnion 34. The centers of the three trunnions 29, 30 and 31 form the vertices of an isosceles triangle of which the apex 29 is located between the axis of the rotation of the device and the line which joins the centers of the trunnions 30 and 31.

In the hollow central space present between the segments 32 and 33 and the levers 26 and 27 is located the sector 35 having a slot of which the sides 36 and 37 enclose the levers 26 and 27 but permit a slight separation thereof; the sector 35 is fixed to a shaft 36' which can turn freely in the box 23 and which is directly connected with the driven member 39.

It will be noticed that the different pieces which constitute the locking gear (levers 26 and 27, trunnions 29, 30, 31 and 34, and segments 32 and 33) are independent both of the member 21 and the member 39 and that the action of the said members on the locking gear can be effected only by the tenon 25 (for the member 21) and by the planes 36 and 37 (for the members 21—39), these acting respectively for separating and drawing together the free ends of the levers 26 and 27, irrespective of the direction of rotation.

When an angular movement is imparted to the driving member 21 in one direction or the other, the tenon 25, acting on one or the other of the levers 26 and 27 and lying between these levers, separates the lower arms, which action, by oscillation of the arms on the trunnion 29, causes the upper arms to be drawn together and causes the separation of the segments from the inner walls of the box 23; the locking gear can then turn freely in the box and carry with it the driven member 39 by the action of one of the levers 26 and 27 on one of the sides 36 or 37 of the slot of the sector 35.

On the other hand, if a couple is applied to the member 39 to effect its rotation in one direction or the other, one of the sides 36 or 37 bears outwardly on the lever corresponding thereto and causes the deformation of the triangle 29, 30, 31 and the separation of the two trunnions 30 and 31 which tightly press the segments 32 and 33 against the inner wall of the box 23, thereby preventing any rotation of the locking gear and in consequence of the members 21 and 39 integral in rotation with such gear through the sector 35.

The apparatus described immediately above relates entirely to the irreversible type of transmission. The object of the invention is to temporarily destroy the said irreversibility either in its entirety or partially, so that when the operator desires, the secondary member can drive the primary member.

As shown in Fig. 1, which is a section along the axis of rotation, an irreversible device, similar to device of the copending application mentioned above, is applied between a primary member 21 and a secondary member 39 the rotation of the primary 21 being transmitted to the secondary member by means of said device. The irreversibility of the system can be suspended by bringing the primary and the secondary members into working engagement by any suitable means as for example a pin 56 sliding in the secondary member 39 and adapted to engage within a hole 57 of same diameter bored in the primary, said engagement being caused by any suitable exterior controlling means (lever, flexible wire, etc.).

Said pin can of course just as well be carried by the primary member to be engaged with the secondary member when desired and it is clear that without impairing the features of my invention the pin shown in the drawings can be replaced by any other organ adapted to engage the primary member with the secondary member as desired.

For this purpose one or several pawls, keys, etc. may be resorted to and the primary member may engage with the secondary member quite indifferently whether by the movement of a movable controlling link or by the relative displacement of the primary member and the secondary member so as to engage the movable member with a connecting part fixed upon the member which does not move.

As above stated, it may sometimes be necessary to effect at any time the reversibility of such an arrangement by means of a decoupling arrangement. Figure 1 shows a design realizing this purpose. The reversibility of the system can be eliminated through the stabilized primary member 21, and the secondary member 39 through a member being moved in the secondary 39. If necessary, this member can engage in a hole 57, which is made in the primary member. Different designs are shown in Figures 2 to 4. The stabilization may be done either partially or completely, and the secondary member, between which the arrangement of the reversible transmission is interposed, by means of a cam or other movable lifter on the outside being operable to join rigidly the primary member and the secondary member. In these designs, the decoupling organ of the reversible arrangement is composed of a lifter 58, capable of revolving with the stabilized axis of the primary member 21. This lifter is inserted between the two branches of a stabilized fork 60 of the driven shaft 39.

Finally, in the last design Figs. 5 and 6, the tenon 25 of the mechanism of the reversible transmission has a convenient section, for example, an elliptic section. On the whole, the decoupling mechanism applied to the arrangement of a reversible transmission described in the copending application 246, 597, may be designed in three different manners, that is to say (A) stabilizing the primary member and the secondary member, between which the arrangement of the irreversible transmission is interposed, by means of a movable lifter on the outside, being capable to rigidly join the primary member and the secondary member. (B) By preventing entirely or partially the reactions of the secondary member upon the reverse order of the blocking segments of the reversible transmission by inserting between the solid branches of the secondary member a cam of convenient section, capable to revolve under the action of a driving gear with a solid axis of the primary member. (C) By preventing entirely or partially the approach of the inferior branches of the reverse of the blocking segments to the reversible transmission arrangement by means of giving the tenon 25 of this reversible transmission arrangement the shape of a cam capable of revolving under the action of a driving gear between both of the already mentioned levers.

The Figs. 2, 3 and 4 refer to an embodiment of my invention in which the engagement of the secondary member and the primary member may be complete or partial; the action of the unclutching member causes in this case, according to the position of said member, the complete or a partial suspension of the reactions of the secondary member upon the controlling levers of the locking segments.

As shown in Figs. 2, 3 and 4 the unclutching member of the irreversible device consists of a cam 58, of a suitable shape, adapted to rotate on a pivot 59 fixed upon the primary member 21; this cam 58 is engaged between the two arms of a fork 60 fixed upon the secondary member 39.

When the cam 58 is in the position shown in Fig. 3, in which position its working face is at some distance from the two arms of the fork 60, the irreversible device may work normally because nothing opposes to the action of the segment 35 upon the lower arms.

On the other hand when the cam 58 is in the position shown in Fig. 4 where its working face is jammed between the two arms of the fork 60, the primary member 21 is rigidly connected with the secondary 39 and the irreversible device cannot work, for any action of segment 35 upon the levers 26 and 27 is prevented.

Between these two positions the cam 58 can be brought to any desired position so that the clearance, between the secondary member and the primary member gives the action of segment 35 upon the levers 26 and 27 the required amplitude to cause, not the locking of segments 32 and 33 against the interior walls of the box 23, but a more or less effective pressure against these walls, so as to cause a partial irreversibility of the transmission gear, by braking more or less energetically the reaction of the secondary member.

It can be seen that by these means it is possible to control, by limiting the amplitude allowed to the levers 26 and 27, the intensity of the locking effect for the normal operation of the irreversible device.

It is well understood that in this case, as in the former, the rotation of the cam may be caused by any suitable device controlled from the outside.

The Figs. 5 and 6 refer to an embodiment of the invention in which the tenon 25 of the primary member (this tenon acting between the levers 26 and 27 causing thereby the rotation of the secondary member) is not given a circular cross section but any other suitable shape (for example elliptic) in order that, according to its angular position, the clearance in the direction of the action may vary as desired; it will be thus possible by rotating from the outside the knob 61 of the pin to alter the distance between the lower arms of the levers and to cause thereby either the unclutching of the irreversible device or to control the braking effect of the segments upon the fixed box 23.

As in the former embodiment the tenon may be rotated from the outside by any suitable device.

It is well understood that the embodiments just described and shown in accompanying drawing have been given only by way of example for the purpose of showing how my invention can be applied and that any other members adapted to cause, by an action from the outside, the partial or the complete unclutching of the irreversible device, either by engaging the primary member with the secondary member or by any controlling action upon the members connecting the primary member and the secondary member may be used without impairing the features of this invention.

It is also obvious that this invention applies, not only to irreversible rotating gears comprising rigid segments but that it applies also to any other devices which secure the same result and more particularly to such devices in which the locking effect is obtained by applying a spring against the walls of a fixed box. The control of the importance of the reactions of the secondary can be obtained by these apparatus either by engagement between the primary and the secondary or by varying the relative positions of the members connecting the primary with the secondary.

What I claim is:

1. An unlocking mechanism for application to an irreversible gear comprising a primary member, a plurality of locking segments, a plurality of levers adapted to act respectively upon the said locking segments each lever having two arms, a secondary member acting upon the outside of the levers, while the primary member is adapted to act on the inside thereof, and a member operated from the outside and adapted to rigidly connect the primary and secondary members.

2. An unlocking mechanism for application to an irreversible gear comprising a primary member, a plurality of locking segments, a plurality of two-armed levers adapted to act upon a respective locking segment, a secondary member, the said primary and secondary members acting respectively upon the interior and exterior of the arms of the said levers, means for rigidly coupling together the primary and secondary members at will so as to prevent the operation of the locking device, the said means comprising a pronged fork connected to one of the said members, and a cam carried by the other member and disposed between the prongs of the said fork, the said cam being rotatable from the exterior about its own axis.

In testimony whereof I have signed my name to this specification.

RAYMOND PETIT.